United States Patent
Zhang

(10) Patent No.: US 8,035,352 B2
(45) Date of Patent: *Oct. 11, 2011

(54) BATTERY CHARGER WITH TEMPERATURE CONTROL

(75) Inventor: Zhengwei Zhang, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/858,278

(22) Filed: Aug. 17, 2010

(65) Prior Publication Data

US 2010/0308773 A1    Dec. 9, 2010

Related U.S. Application Data

(63) Continuation of application No. 12/574,209, filed on Oct. 6, 2009, now Pat. No. 7,777,454, which is a continuation of application No. 11/636,337, filed on Dec. 8, 2006, now Pat. No. 7,598,710.

(51) Int. Cl.
     *H02J 7/00* (2006.01)
(52) U.S. Cl. ............ 320/152; 320/128; 320/137
(58) Field of Classification Search .......... 320/152
     See application file for complete search history.

(56) References Cited

U.S. PATENT DOCUMENTS

| | | | |
|---|---|---|---|
| 5,140,269 A | 8/1992 | Champlin | |
| 5,708,348 A | 1/1998 | Frey et al. | |
| 5,751,139 A | 5/1998 | Jordan et al. | |
| 5,789,903 A | 8/1998 | Young et al. | |
| 5,945,806 A | 8/1999 | Faulk | |
| 6,184,659 B1 | 2/2001 | Darmawaskita | |
| 6,286,109 B1* | 9/2001 | Pirdy | 713/340 |
| 6,310,467 B1 | 10/2001 | Sauer | |
| 6,456,044 B1 | 9/2002 | Darmawaskita | |
| 6,531,848 B1* | 3/2003 | Chitsazan et al. | 320/153 |
| 6,836,095 B2 | 12/2004 | Fogg | |
| 7,176,654 B2 | 2/2007 | Meyer et al. | |
| 7,180,268 B2 | 2/2007 | Denning et al. | |
| 7,202,651 B2 | 4/2007 | Chapuis | |
| 7,239,115 B2 | 7/2007 | Chapuis et al. | |
| 7,249,267 B2 | 7/2007 | Chapuis | |
| 7,498,769 B1 | 3/2009 | Potanin et al. | |
| 7,524,108 B2 | 4/2009 | Yoshida et al. | |
| 2005/0212484 A1 | 9/2005 | Denning et al. | |
| 2005/0212489 A1 | 9/2005 | Denning et al. | |
| 2005/0216220 A1 | 9/2005 | Kim | |
| 2005/0269992 A1 | 12/2005 | Lai et al. | |
| 2006/0103354 A1 | 5/2006 | Gubbins | |
| 2007/0024243 A1 | 2/2007 | Liu et al. | |
| 2007/0029975 A1 | 2/2007 | Martin et al. | |
| 2007/0075682 A1 | 4/2007 | Guang et al. | |
| 2007/0126405 A1* | 6/2007 | Kao et al. | 320/150 |

* cited by examiner

*Primary Examiner* — M'Baye Diao
(74) *Attorney, Agent, or Firm* — Perkins Coie LLP

(57) ABSTRACT

A battery charger integrated circuit with temperature control is disclosed that includes a temperature sensor circuit and a charging current generator circuit. Upon receiving a temperature reading voltage (VDT), the temperature sensing circuit is operable to generate a second reference voltage (VREF) that is a function of the first reference voltage (VREF1). The charging current generator circuit generates and continuously adjusts a reference current (I1) and a charging current (IOUT) according to the second reference voltage (VREF). Whenever the temperature reading voltage (VDT) exceeds the first reference voltage, the temperature sensor circuit is operable to adjust the second reference voltage (VREF).

14 Claims, 3 Drawing Sheets

BATTERY CHARGER WITH TEMPERATURE CONTROL

CROSS-REFERENCE TO RELATED APPLICATION(S)

The present application is a continuation of U.S. patent application Ser. No. 12/574,209, filed Oct. 6, 2009 now U.S. Pat. No. 7,777,454 and entitled BATTERY CHARGER WITH TEMPERATURE CONTROL, which is a continuation of U.S. patent application Ser. No. 11/636,337, filed Dec. 8, 2006 now U.S. Pat. No. 7,598,710 and entitled BATTERY CHARGER WITH TEMPERATURE CONTROL, both of which are incorporated herein by reference in their entirety.

TECHNICAL FIELD

The present invention relates generally to the field of electronic circuits. More particularly, the present invention relates to battery charger integrated circuit.

BACKGROUND

It is a common experience that when charging a battery, the battery charger integrated circuit (IC) that generates the charging current tends to overheat. The rise in temperature is caused by the IC power consumption in form of heat dissipation of the charging current. Naturally, when the charging current is reduced, the heat is also reduced. Over the years, there have been many attempts to achieve an optimal charging current value that effectively charges the battery and does not overheat battery charger IC at the same time. Some of these attempts seem to be either too complicated or too expensive. Because most of the rechargeable batteries are used in consumer electronic products, the cost and the size of the battery charger IC are important factors for the electronics manufacturers.

The present invention provides an effective, small-sized, and inexpensive circuit and a method to achieve both effective charging and overheating prevention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to different embodiments of the invention, examples of which are illustrated in the accompanying drawings. While the invention will be described in conjunction with these different embodiments, it will be understood that they are not intend to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of the ordinary skill in the art that the present invention may be practiced without these specific details. In other instances, well-known methods, procedures, components, and circuits have not been described in detail so as not to unnecessarily obscure aspects of the present invention.

Figure 1:
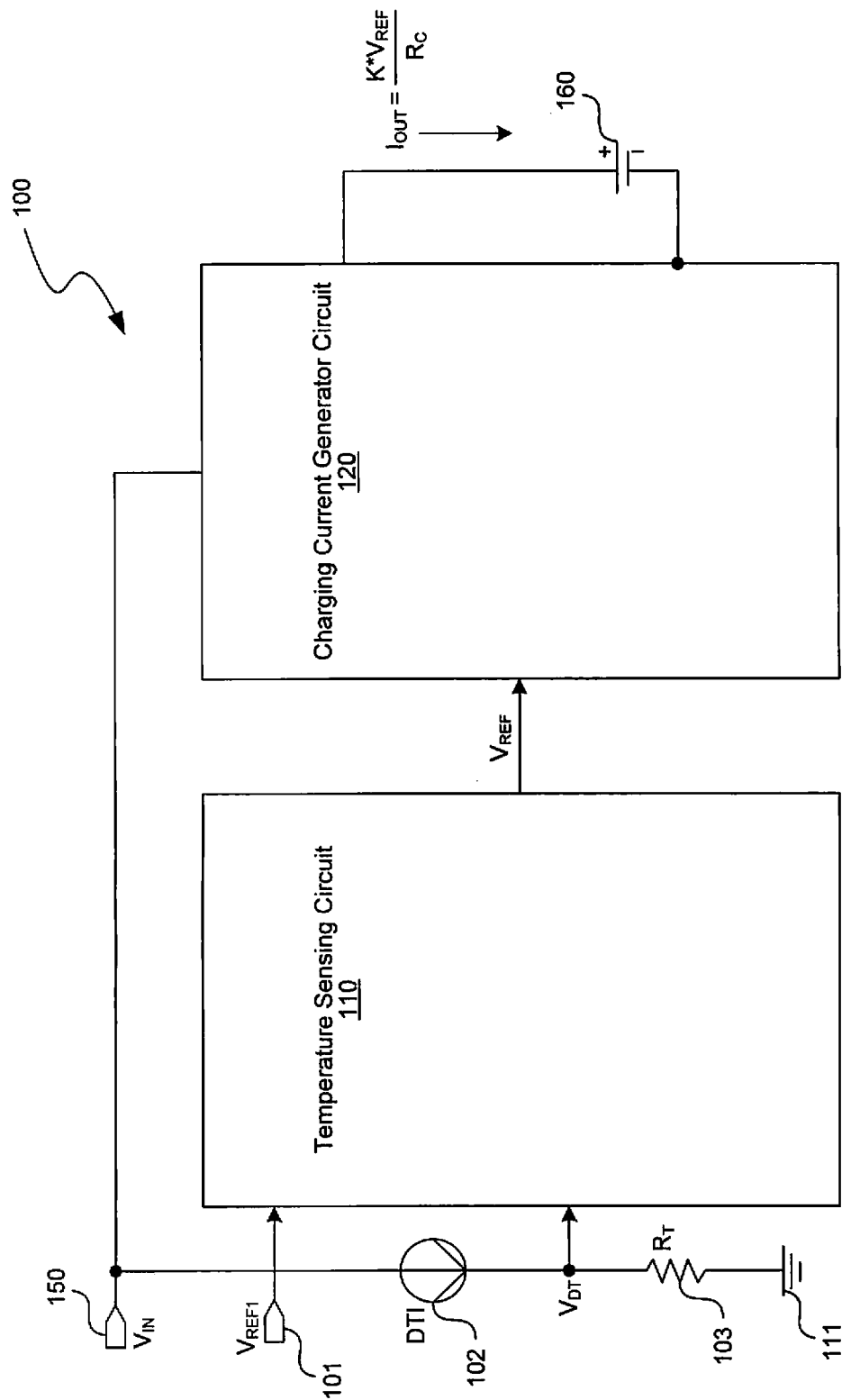
FIG. 1 illustrates a block diagram of a battery charger with temperature control that has a temperature sensing circuit and a charging current generator circuit in accordance with an embodiment of the present invention.

Now referring to FIG. 1, a block diagram of a battery charger integrated circuit (IC) with temperature control 100 in accordance with an embodiment of the present invention is illustrated. Battery charger integrated circuit with temperature control 100 includes a temperature sensing circuit 100 electrically coupled to a charging current generator circuit 120. Temperature sensing circuit 110 receives a first reference voltage (VREF1) 101 and reading temperature voltage (VDT) obtained from a direct temperature measurement of battery charger integrated circuit 100. In one embodiment, a die temperature indicator (DTI) 102 is used to measure the temperature of battery charger integrated circuit 100. The current generated by the die temperature indicator (DTI) 102 is proportional to the temperature of battery charger integrated circuit 100. This current is converted into temperature reading voltage (VDT) by a sensing resistor (RT) 103. Temperature sensing circuit 110 compares the temperature reading voltage (VDT) with the first reference voltage (VREF1) and generates a second reference voltage (VREF). The second reference voltage (VREF) is, in turn, fed to charging current generator circuit 120. Charging current generator circuit 120 uses the second reference voltage (VREF) to generate a reference current (I1) and a charging current (IOUT) for a battery 160 that is plugged into battery charger integrated circuit 100. In one embodiment, charging current (IOUT) mirrors the reference current (I1) and is linearly proportional to second reference voltage (VREF), e.g., IOUT is proportional to VREF.

In operation, temperature sensing circuit 110 compares the temperature reading voltage (VDT) with first reference voltage (VREF1). Whenever temperature reading voltage (VDT) surpasses first reference voltage (VREF1), temperature sensing circuit 110 adjusts second reference voltage (VREF). As such, charging current generator circuit 120 senses the adjustment in second reference voltage (VREF) and changes the reference current (I1) that, in turn, changes the charging current (IOUT). In one embodiment, temperature sensing circuit 110 is constructed so that second reference voltage (VREF) is linearly proportional to first reference voltage (VREF1) and temperature reading voltage (VDT). In one embodiment, temperature sensing circuit 110 is constructed in such a manner that second reference voltage is a function of the first reference voltage (VREF1) and the temperature reading voltage (VDT). It is noted that any relationship between first reference voltage (VREF1) and second reference voltage (VREF) so that the change in the temperature reading voltage (VDT) causes a change in second reference voltage (VREF) that causes a change in the charging current (IOUT) is within the scope of the present invention Now referring to FIG. 2, the detailed schematic diagram of a battery charger integrated circuit with temperature control 200 in accordance with an embodiment of the present invention is illustrated. More particularly, temperature sensing circuit 110 includes a first error amplifier 201 that is electrically coupled to a first n-channel Metal Oxide Semiconductor (nMOS) 202 and a resistive divider circuit configured by a first resistor (R1) 203 and a second resistor (R2) 204. More particularly, first reference voltage (VREF1) is electrically connected to an inverting terminal of first error amplifier 201. Die temperature indicator (DTI) 102 is connected between the inverting terminal and non-inverting terminal of first error amplifier 201. Sensing resistor (RT) is connected to the non-inverting terminal of first error amplifier 201 and an electrical ground 111. The output terminal of first error amplifier 201 is electrically coupled to the gate of first nMOS transistor 202. First resistor (R1) 203 is electrically connected to the inverting terminal of first error amplifier 201 and the drain of first nMOS transistor 202. Second resistor (R2) 204 is electrically coupled between the drain and the source of first nMOS transistor 202.

Figure 2:
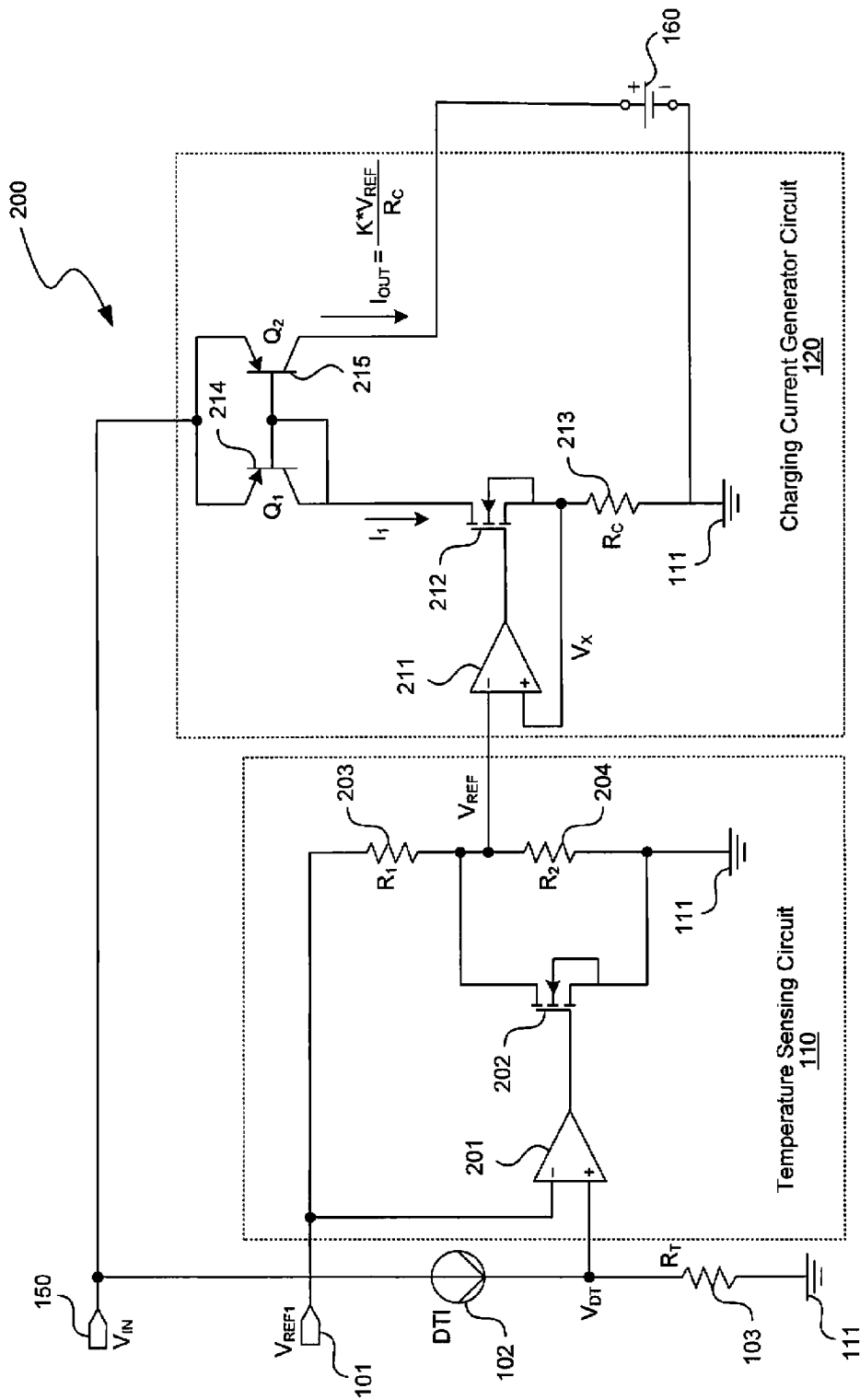
FIG. 2 illustrates a detailed schematic diagram of the battery charger with temperature control in accordance with an embodiment of the present invention.

Continuing with FIG. 2, charging current generator circuit 120 includes a second error amplifier 211 connected in series to a second nMOS transistor 212, and current mirror circuit configured by a first pnp bipolar junction transistor 214 and a second pnp bipolar junction transistor 215. More particularly, first pnp bipolar junction transistor 215 and second pnp bipolar junction transistor 215 form a current mirror with first pnp bipolar junction transistor 214. First pnp bipolar junction transistor 214 is connected as a diode and its collector connected to the drain of second nMOS transistor 212. The collector of second pnp bipolar junction transistor 215 is connected to battery 162. The bases of first pnp bipolar junction transistor 214 and second bipolar junction transistor are connected together and to an input voltage (VIN) 150. The non-inverting terminal of second error amplifier 211 is connected to the source of second nMOS transistor 212 and to a resistor (RC) 213. The other terminal of resistor (RC) 213 is connected to electrical ground 111.

Referring again to FIG. 2, in operation, when reading temperature voltage (VDT) is less than first reference voltage (VREF1), the output of first error amplifier 201 is LOW, causing first nMOS transistor 202 to be in cutoff mode. As a result, second reference voltage (VREF) equals to first reference voltage (VREF1) divided by the sum of first resistor (R1) 203 and second resistor (R2) 204 and multiplied by second resistor (R2) 204. However, as the temperature of battery charger integrated circuit 200 increases, temperature reading voltage (VDT) also increases. If temperature reading voltage (VDT) exceeds first reference voltage (VREF1), the ratio between first reference voltage (VREF1) and second voltage reference (VREF) will start to change. Second reference voltage (VREF) is fed to charging current generator circuit 120. There, second reference voltage (VREF) is compared with voltage (VX) at the non-inverting terminal of second error amplifier 211. Second error amplifier 211 is configured such that it sets voltage (VX) equals to second reference voltage (VREF). Thus, the reference current (I1) equals second reference voltage (VREF) divided by resistor (RC) 213. In one embodiment, first npn bipolar transistor (Q1) and second npn bipolar transistor (Q2) 215 have different sizes so that the charging current (IOUT) is proportional to the reference current (I1) by a factor of K. When the temperature reading voltage (VDT) exceeds first reference voltage (VREF1), reflecting the limit in the temperature of the die temperature indicator (DTI) 102 is reached, first error amplifier 201 adjusts its output voltage that turns on first nMOS transistor 202. The turning on of first nMOS transistor 202 changes the value of resistive divider ratio by bypassing currents to electrical ground 111 from second reference voltage (VREF) node, thus changing second reference voltage (VREF). This change in second reference voltage (VREF) is introduced to charging current generator circuit 120 at the non-inverting terminal of second error amplifier 211. The lowering of second reference voltage (VREF) reduces the gate voltage of second nMOS transistor 212. Thus, the reference current (I1) is also reduced. As a consequence, the charging current (IOUT) will also be reduced.

Figure 3:
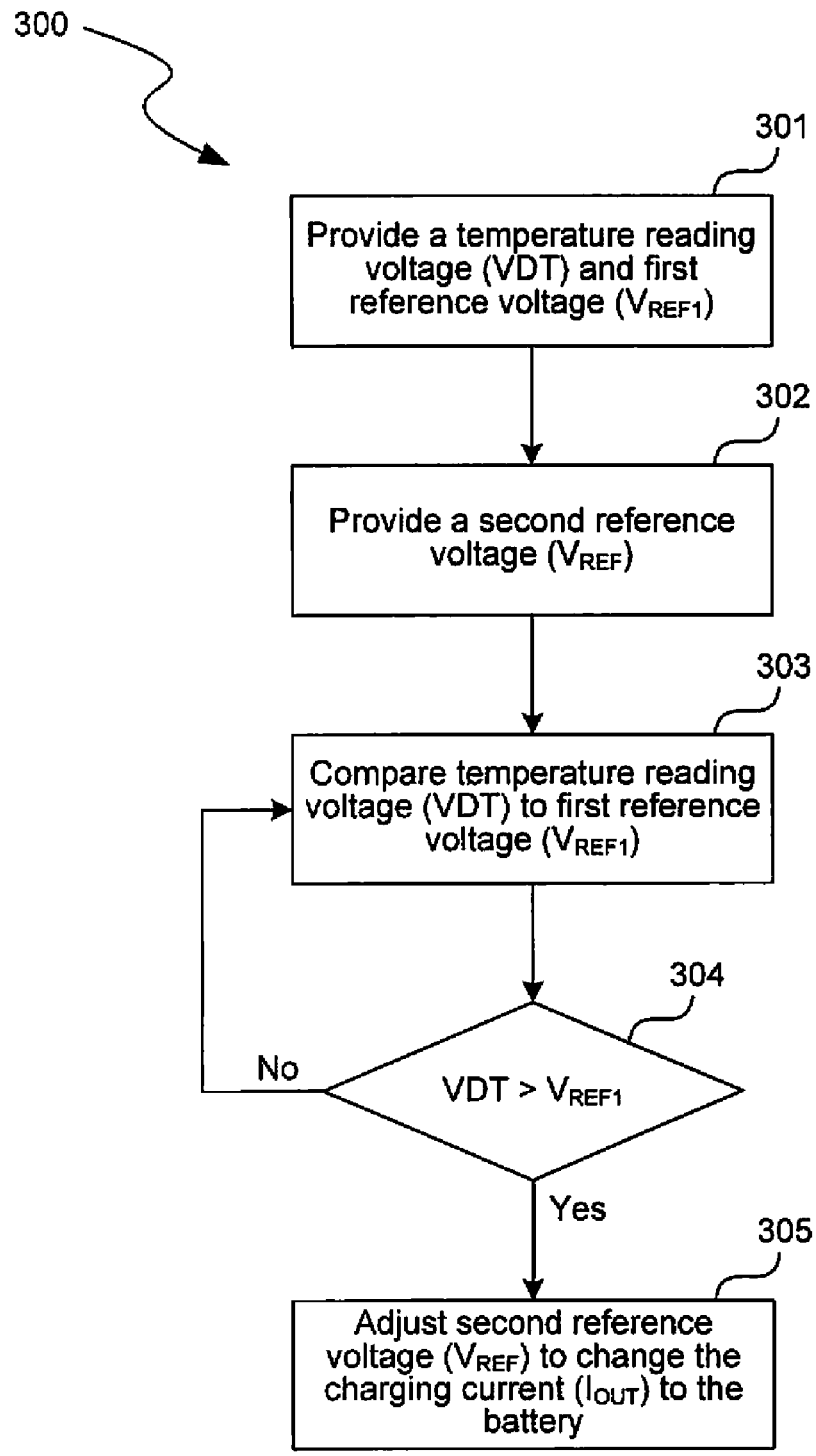
FIG. 3 illustrates a flow chart illustrating a method of temperature control in a batter charger circuit in accordance with an embodiment of the present invention

Now referring to FIG. 3, a flow chart 300 representing a method of providing temperature control for a battery charger circuit is illustrated. Method 300 includes the steps of providing a temperature reading voltage, providing reference voltages that are related to the temperature reading voltage, comparing the first reference voltage (VREF1) with the temperature reading voltage (VDT), and adjusting the second reference voltage (VREF) in order to reduce the temperature whenever the temperature reading voltage (VDT) surpasses the first reference voltage (VREF1).

Now referring to step 301, a temperature reading voltage (VDT) is provided that is proportional to the die temperature indicator of the batter charger circuit. In reality, step 301 is implemented by connecting a die temperature indicator (DTI) to a sensing resistor (RT) across the two input terminals of an error amplifier such as first error amplifier 201 as shown in FIG. 2 of the present invention.

Referring now to step 302, a first reference voltage (VREF1) is provided. Also in step 302, a second reference voltage (VREF) is derived from first reference voltage (VREF1). Then, a reference current (I1) and charging current (IOUT) are generated using the second reference voltage (VREF). Step 302 is implemented by connecting first reference voltage (VREF1) source to the inverting terminal of first error amplifier 201 as shown in FIG. 1 and FIG. 2.

Referring to step 302, temperature reading voltage (VDT) is compared with first reference voltage (VREF1). Step 302 is implemented by first error amplifier 201 connected to die temperature indicator (DTI) 102 and sensing resistor (RT) 103 as shown in FIG. 2 of the present invention.

Referring now to step 304, whenever the temperature reading voltage (VDT) surpasses the first reference voltage (VREF1), adjusting the second reference voltage (VREF) so that the charging current (IOUT) is adjusted. Step 304 is implemented by temperature sensing circuit 110 connected to charging current generator circuit 120 as shown in FIG. 2. If the temperature reading voltage (VDT) is less than the first reference voltage, continue step 303 and the normal operation of battery charger circuit 200.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A battery charger integrated circuit comprising:
   a temperature sensor circuit, electrically coupled to receive a first reference signal and a temperature signal, operable to generate a second reference signal, wherein when the temperature signal is greater than the first reference signal, an adjust signal is generated to adjust the second reference signal; and
   a charging current generator circuit, electrically coupled to receive the second reference signal, operable to generate a charging current based on the second reference signal, wherein the charging current is reduced when the temperature signal is greater than the first reference signal such that a charging die is prevented from exceeding a predetermined temperature.

2. The battery charger integrated circuit of claim 1, wherein the charging current is generated based on the second reference signal and a reference current.

3. The battery charger integrated circuit of claim 1, wherein the first reference signal is a current signal or a voltage signal and the second reference signal is a current signal or a voltage signal.

4. The battery charger integrated circuit of claim 1, wherein the temperature signal is a current signal or a voltage signal.

5. The battery charger integrated circuit of claim 1, wherein the second reference signal is related to the first reference signal.

6. The battery charger integrated circuit of claims 1, wherein the adjust signal is linearly proportional to the temperature signal when the temperature signal is greater than the first reference signal.

7. The battery charger integrated circuit of claim 1, wherein the charging current is linearly proportional to the second reference signal.

8. A method of providing temperature control in a battery charger integrated circuit, comprising:
    receiving a temperature signal indicating a temperature measurement of the battery charger integrated circuit;
    comparing the temperature signal with a first reference signal to generate an adjust signal when the temperature signal is greater than the first reference signal;
    generating a second reference signal related to the adjust signal; and
    generating a charging current based on the second reference signal, wherein the charging current is reduced when the temperature signal is greater than the first reference signal such that a charging die is prevented from exceeding a predetermined temperature.

9. The battery charger integrated circuit of claim 8, wherein the charging current is generated based on the second reference signal and a reference current.

10. The battery charger integrated circuit of claim 8, wherein the first reference signal is a current signal or a voltage signal and the second reference signal is a current signal or a voltage signal.

11. The battery charger integrated circuit of claim 8, wherein the temperature signal is a current signal or a voltage signal.

12. The battery charger integrated circuit of claim 8, wherein the second reference signal is related to the first reference signal.

13. The battery charger integrated circuit of claim 8, wherein the adjust signal is linearly proportional to the temperature signal when the temperature signal is greater than the first reference signal.

14. The battery charger integrated circuit of claim 8, wherein the charging current is linearly proportional to the second reference signal.

* * * * *

UNITED STATES PATENT AND TRADEMARK OFFICE
CERTIFICATE OF CORRECTION

PATENT NO. : 8,035,352 B2  
APPLICATION NO. : 12/858278  
DATED : October 11, 2011  
INVENTOR(S) : Zhengwei Zhang Page 1 of 1

It is certified that error appears in the above-identified patent and that said Letters Patent is hereby corrected as shown below:

In column 1, line 56, delete "batter" and insert -- battery --, therefor.

In column 1, line 57, delete "invention" and insert -- invention. --, therefor.

In column 2, line 60, delete "invention" and insert -- invention. --, therefor.

In column 4, line 17, delete "batter" and insert -- battery --, therefor.

In column 5, line 17, in claim 6, delete "claims" and insert -- claim --, therefor.

Signed and Sealed this  
Twenty-seventh Day of December, 2011

David J. Kappos  
*Director of the United States Patent and Trademark Office*